Figure 1:
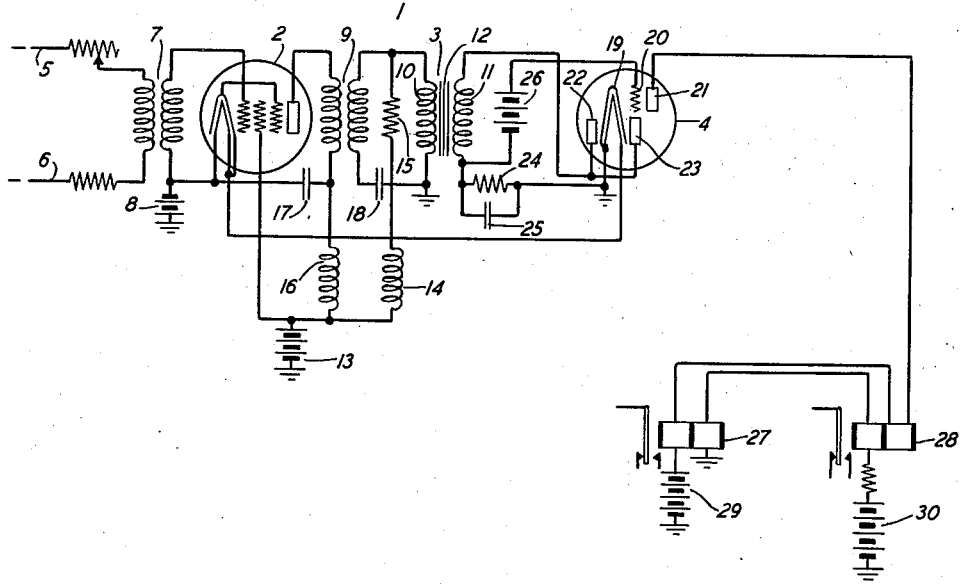

April 25, 1939.　　　H. E. VAUGHAN　　　2,155,696
MEASURING CIRCUIT
Filed Oct. 8, 1937

INVENTOR
H. E. VAUGHAN
BY Wayne B Wells
ATTORNEY

Patented Apr. 25, 1939

2,155,696

UNITED STATES PATENT OFFICE 2,155,696

MEASURING CIRCUIT

Henry E. Vaughan, Valley Stream, N. Y., assignor to Bell Telephone Laboratories, Incorporated, New York, N. Y., a corporation of New York Application October 8, 1937, Serial No. 167,914

9 Claims. (Cl. 178—44)

This invention relates to measuring circuits and particularly to circuits for measuring the energy variations of a control current.

One object of the invention is to provide an improved and simplified measuring circuit that shall have a high sensitivity.

Another object of the invention is to provide a measuring circuit having a biased impulse transformer with a core composed of material having high permeability that shall have a high impedance rectifying load connected to the transformer to insure sensitivity in operation.

A further object of the invention is to provide a measuring circuit having a single impulse transformer operated by an amplified control current and biased to insure operation only by peaks of control current above a predetermined value that shall insure against an appreciable load upon the transformer and that shall control a raise gain relay and a lower gain relay by a current having potential variations opposite to and more than proportional to the variations in potential of the control current.

In long signal transmission lines it has been found necessary to adjust the gain at various repeater stations to correct for variations in the line impedance. Pilot wire regulators of any suitable type are generally employed to control the gain at the repeater stations. There is a small error in the operation of each of the pilot wire regulators and when the regulators operate in the same direction, the errors add together. In a very long transmission line the added errors of the regulators may be appreciable.

In a regulator of the type disclosed in the patent to L. G. Abraham and A. F. Grenell 2,060,843, issued November 17, 1936, control is effected in accordance with the energy variations of a control current which is transmitted over the signal line. The potential variations in control current of the system disclosed in the Abraham et al. Patent 2,060,843 are measured by the circuit disclosed in the A. M. Curtis Patent No. 2,096,450, October 19, 1937, for obtaining potential variations to control the gain on the transmission.

The present invention discloses a simplified measuring circuit which may be employed to control the system disclosed in the above-mentioned patent to L. G. Abraham et al. 2,060,843. The simplified measuring circuit may be used in the circuit disclosed in the A. M. Curtis patent provided the connections from the raise gain relay and the lower gain relay are reversed.

According to the invention, a control current which in the system under consideration has a frequency of 800 cycles, is transmitted over a signal transmission line. The control current is supplied to a measuring circuit where the variations in potential are measured and supplied with a more than proportional change to a lower gain relay and raise gain relay. The control current is first amplified and then supplied to a single impulse transformer. The impulse transformer is provided with a primary winding and a secondary winding and has a core composed of a material having high permeability. Preferably the impulse transformer is of the same type as that disclosed in the above-mentioned patent to A. M. Curtis, No. 2,096,450. The core of the impulse transformer, as set forth in the above-mentioned patent, may be composed of an alloy of nickel, iron and molybdenum. A bias is provided in the operation of the transformer by a direct current circuit connected to the primary winding. The bias on the impulse transformer insures that the measuring circuit will only operate on the peaks of the control current which are above a predetermined value.

The sensitivity of an impulse transformer of the type under consideration is varied according to the load on the secondary circuit. The slope of the characteristic curve of such a transformer comparing the input to the output is varied to lower the sensitivity if a load of any appreciable amount is placed on the secondary winding.

In one form of the invention the output from the secondary winding of the impulse transformer is connected to the rectifying portion of a diode-triode space discharge device. This rectifying circuit contains a resistance element of relatively large size and insures against any appreciable load being formed on the impulse transformer. The voltage drop across the resistance element in the rectifier circuit is used to control the grid voltage of the triode in the diode-triode device. The grid of the triode has a positive bias impressed on it so that the maximum current flows through the triode when there is no input current to the measuring circuit. When control current is supplied to the impulse transformer there is a voltage drop across the resistance element in the rectifier circuit which is applied as a negative bias to the grid of the triode and accordingly the plate current from the triode is decreased with increase of control current in the input. The output circuit from the triode of the diode-triode space discharge device is employed to control a lower gain relay and a raise gain relay of the type disclosed in the above-mentioned patent to A. M. Curtis, 2,096,450.

In a measuring circuit of the type above outlined, the output from the triode will have potential variations more than proportional to the potential variations in the control current and in a direction opposite to the potential variations of the control current. Inasmuch as the potential variations in the output from the triode are opposite to the potential variations of the control current supplied to the impulse core, it is necessary to reverse the connections from the raise gain relay and the lower gain relay as shown in the above mentioned patent to A. M. Curtis No. 2,096,450.

Figure 2:
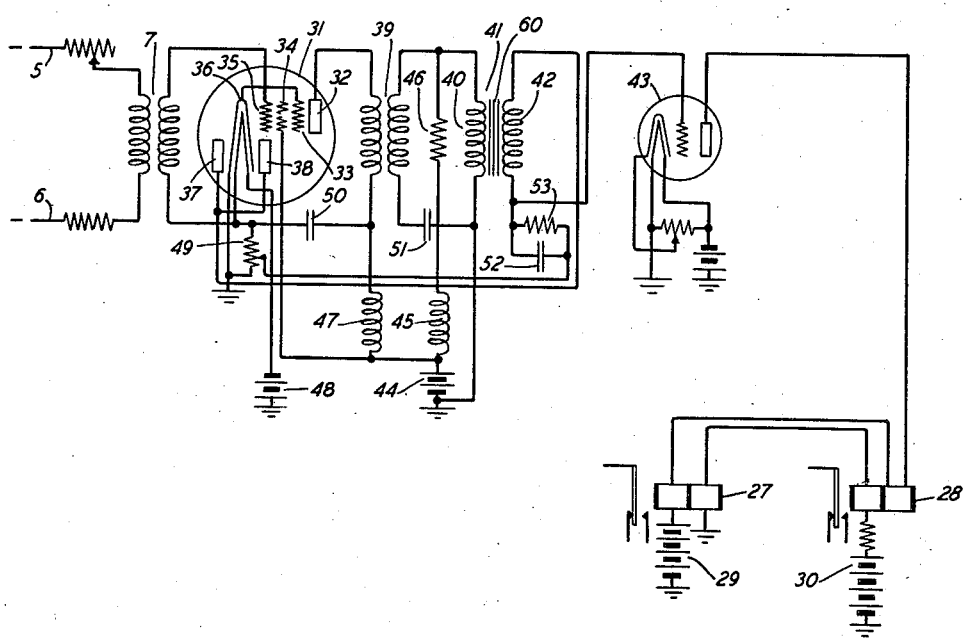

In the accompanying drawing:

Fig. 1 is a diagrammatic view of a measuring circuit constructed in accordance with the invention; and Fig. 2 is a diagrammatic view of a modification of the measuring circuit shown in Fig. 1 of the drawing.

Referring to Fig. 1 of the drawing, a measuring circuit is shown comprising a pentode space discharge device 2, an impulse transformer 3 and a diode-triode space discharge device 4. Input conductors 5 and 6 are supplied with a control current, which in the system under consideration has a frequency of 800 cycles. The input conductors 5 and 6 are connected by a transformer 7 to the input circuit of the pentode space discharge device 2. A battery 8 is provided for supplying not only a bias to the control grid of the device 2 but also for supplying heating current to the cathode of the device 2 and the device 4. The output circuit of the device 2 is coupled by a transformer 9 to the impulse transformer 3.

The impulse transformer 3 comprises a primary winding 10, a secondary winding 11 and a core 12 which is composed of a material having a high permeability. Preferably the core 12 is composed of thin ribbons of an alloy of nickel, iron and molybdenum wound in a box of ceramic insulating material. A biasing circuit is provided for the impulse transformer 3 which may be traced from a grounded battery 13 through a retard coil 14, resistance element 15 and the primary winding 10 to ground. The biasing circuit serves to magnetize the transformer core so that operation takes place only on the peaks of the control current when above a predetermined value. The battery 13 also serves to supply plate potential to the device 2 through a retard coil 16. Condensers 17 and 18 serve as blocking condensers.

The diode-triode space discharge device 4 comprises a cathode 19, a control grid 20, an anode 21 in the triode and two anodes 22 and 23 in the diode. The triode in the device 4 serves as a detector. The secondary winding 11 of the impulse transformer 3 is connected in circuit with the diode portion of the diode-triode device 4. The two anodes 22 and 23 are connected together so that rectification only takes place of one-half of the waves supplied by the impulse transformer. A resistance element 24 shunted by a condenser 25 is included in the rectifying circuit. The resistance element 24 is of appreciable size in order to add to the impedance of the load circuit connected to the secondary winding of the impulse transformer. The condenser 25 is employed to maintain the potential drop across the resistance element 24 between voltage peaks which are very sharp and of short duration due to the action of the impulse transformer 3.

The voltage drop across the resistance 24 of the rectifying circuit is employed to impress a negative bias on the grid 20 of the device 4. A battery 26 is employed to impress a positive bias on the grid 20. Normally the grid 20 of the triode has a positive potential impressed on it so that a maximum current is supplied by the triode when there is no input control current supplied to the measuring circuit. When control current is supplied to the measuring circuit with peaks above a predetermined value, there is a voltage drop across the resistance element 24 which applies a negative bias to the grid 20 for reducing the plate current supplied to a lower gain relay 27 and a raise gain relay 28. Plate potential for the triode of the device 4 is supplied from a battery 29 through coils of the relays 27 and 28. A battery 30 is provided for polarizing the two relays 27 and 28.

In the circuit disclosed in Fig. 1 it will be noted that the potential variations in the output circuit from the triode of the device 4 vary oppositely from the potential variations in the control current supplied to the amplifier device 2. The potential variations in the output circuit of the triode not only vary oppositely from the variations of potential in the control current but have a more than proportional change by reason of the action of the impulse transformer 3. The impulse transformer has substantially no load thereon because of a high impedance of rectifying circuit so that only potential variations are provided for supplying variable negative grid bias to the grid 20 of the triode. By reason of the output from the triode having potential variations opposite from the potential variations of the control current, it is necessary to reverse the connections controlled by the relays 27 and 28. The relays 27 and 28 will both be operated to raise the gain in a circuit of the type disclosed in the above-mentioned patent to A. M. Curtis No. 2,096,450 and will both be released to lower the gain. In order to effect this operation it is necessary to reverse the connections of the contacts associated with the armatures of the relays 27 and 28.

The modification of the invention shown in Fig. 2 of the drawing is similar in many respects to the arrangement shown in Fig. 1. Like parts in Fig. 2 to those shown in Fig. 1 will be indicated by similar reference characters.

Referring to Fig. 2, the input conductors 5 and 6 are connected by the transformer 7 to a diode-pentode space discharge device 31. The pentode comprises an anode 32, a suppressor grid 33, a screen grid 34, a control grid 35, and a cathode 36. The diode comprises two anodes 37 and 38 which are connected together. The output circuit of the pentode is connected by a transformer 39 to the primary winding 40 of the impulse transformer 41. The secondary winding 42 of the impulse transformer 41 is coupled to a space discharge device 43 by means of the resistance element 53. The device 43 operates as a detector. The output circuit of the device 43 is connected to the two polarized relays 27 and 28. The impulse transformer 41 is provided with a core 60 having a high permeability.

The primary winding 40 of the impulse transformer 41 is energized from the battery 44 to provide a bias for the operation of the impulse transformer. The circuit of the battery 44 may be traced from one terminal of the battery 44 through the retard coil 45, resistance element 46, primary winding 40 and ground return to the other terminal of the battery. The battery 44 also supplies plate potential for the anode 32 of the pentode through a retard coil 47. A battery 48 is provided for heating the filament of the cathode 36 in series with a resistance element 49. A portion of the potential drop across the resistance element 49 is employed for impressing a positive bias on the control grid of the space discharge device 43. The condensers 50 and 51 serve as blocking condensers.

The output from the impulse transformer 41 is rectified by the diode comprising the anodes 37 and 38 and the cathode 36 in the device 31. The rectifier circuit may be traced from one terminal to the secondary winding 42 through the anodes 37 and 38 in parallel, cathode 36, a portion of the resistance element 49 and a condenser 52 and a resistance element 53 in parallel to the other terminal of the secondary winding 42. The potential drop across the resistance element 53 and a portion of the resistance element 49 is impressed on the input circuit of the space discharge device 43. The resistance element 49 impresses a positive bias on the grid of the device 43 whereas the resistance element 53 impresses a variable negative bias on the grid according to the potential variations of the control current supplied to the measuring circuit.

The impulse transformer 41 is similar in construction and operation to the impulse transformer 3 in Fig. 1 of the drawing. Moreover, the rectifier circuit connected to the impulse transformer 41 has very high impedance so as to insure against any extensive current flow therethrough and a corresponding load on the impulse transformer. The relays 27 and 28 in the output circuit of the device 43 are controlled in the same manner as similar relays in the output circuit of the device 4 in the system shown in Fig. 1 of the drawing.

Modifications in the circuits and in the arrangement and location of parts may be made within the spirit and scope of the invention and such modifications are intended to be covered by the appended claims.

What is claimed is:

1. A measuring circuit for obtaining a more than proportional change in the energy variations of a control current comprising an impulse transformer having primary and secondary windings and a core composed of a material having high permeability, means for energizing said primary winding according to energy variations in the control current, means for constantly magnetizing said core to provide a bias in the operation of the transformer, rectifying means having a relatively high impedance connected to said secondary winding to provide the impulse transformer with a high impedance load, a space discharge device, and means for controlling said device according to the rectified potential from the impulse transformer to have an output varying oppositely to variations in the control current.

2. A measuring circuit for obtaining a more than proportional change in the energy variations of a received control current comprising a transformer having primary and secondary windings and a core with a high permeability, means for energizing said primary winding according to variations in a received control current, means for constantly energizing the primary winding to maintain said core normally saturated and to prevent effective operation of said transformer until a received control current has sufficient strength to overcome the bias, and means having a relatively high impedance for rectifying the potential output from said transformer.

3. A measuring circuit for obtaining a more than proportional change in the energy variations of a control current comprising an impulse transformer having primary and secondary windings and a core composed of a material having a high permeability, means for energizing said primary winding according to energy variations in the control current, means for magnetizing said core to provide a bias in the operation of the transformer, means for providing a high impedance load on said transformer and means for supplying a current under control of the transformer output and having energy variations opposite to the energy variations of the control current.

4. A measuring circuit for obtaining a more than proportional change in the energy variations of a control current comprising an impulse transformer having primary and secondary windings and a core composed of a material having a high permeability, means for energizing said primary winding according to energy variations in the control current, means for magnetizing said core to provide a bias in the operation of the transformer, a high impedance potential rectifying circuit connected to said transformer secondary winding, and a triode controlled from said rectifying circuit to supply a current having energy variations opposite to the energy variations of the control current.

5. A measuring circuit for obtaining a more than proportional change in the energy variations of a control current comprising an impulse transformer having primary and secondary windings and a core composed of a material having a high permeability, an amplifier for supplying amplified control current to the transformer primary winding, means for energizing said primary winding with direct current to provide a bias in the operation of the transformer, a high impedance potential rectifying circuit connected to said transformer secondary winding, and a detector device controlled from said rectifying circuit to supply a current having energy variations opposite to the energy variations of the control current.

6. A measuring circuit for obtaining a more than proportional change in the energy variation of a received control current comprising an amplifier space device supplied with said control current, a transformer connected to the output circuit of said device and having primary and secondary windings and a core with a high permeability, means for constantly energizing said primary winding to maintain said core normally saturated and to prevent effective operation of said transformer until a received control current has sufficient strength to overcome the transformer bias, a triode detector means for impressing normal positive bias on the grid of said detector tube, and means for rectifying the output from said transformer to impress a variable negative bias on the grid of said triode detector to supply a current according to the peaks of the control current.

7. A measuring circuit for obtaining a more than proportional change in the energy variations of a control current comprising a space discharge device having a rectifying portion and an amplifying portion, an impulse transformer having primary and secondary windings and a core composed of a material having a high permeability, the primary winding being connected to the output side of the amplifying portion of said device and the input side of said amplifying portion being supplied with control current, means comprising a high impedance circuit for connecting said secondary winding to the rectifying portion of said device and a detector device controlled by said rectifying circuit.

8. A measuring circuit for obtaining a more than proportional change in the energy variations of a control current comprising an impulse transformer having primary and secondary windings and a core composed of a material having a high permeability, means for magnetizing said core to provide a bias in the operation of the transformer, a space discharge device having an amplifier for supplying the control current to the primary winding of said transformer and a rectifying portion in a high impedance circuit, means for biasing the rectifying portion of said device and for rectifying the output from the transformer by the rectifying portion of said device, and a detector device controlled by the rectified output from said transformer.

9. A measuring circuit for obtaining a more than proportional change in the energy variations of a control current comprising an impulse transformer having primary and secondary windings and a core composed of a material having a high permeability, means for magnetizing said core to provide a bias in the operation of the transformer, a diode-pentode space discharge device, the pentode of said device supplying amplified control current to the transformer primary winding and the diode of said device rectifying the output potential from the transformer, means comprising a resistance element in the filament heating circuit for said device to provide a bias on said diode, a detector device, and means for connecting said detector device to the diode circuit to supply an output voltage varying oppositely to the energy variations of the control current.

HENRY E. VAUGHAN.